United States Patent
Mallinger

[15] 3,658,159
[45] Apr. 25, 1972

[54] BRAKE DEVICE
[72] Inventor: John Mallinger, 109 N. Childs Street, Woodbury, N.J. 08095
[22] Filed: Aug. 7, 1970
[21] Appl. No.: 61,946

[52] U.S. Cl. ............................................ 188/77 R, 188/361
[51] Int. Cl. ........................................................ F16d 49/12
[58] Field of Search ............................... 188/75–77, 70 R, 188/70 B, 361

[56] References Cited

UNITED STATES PATENTS

| | | |
|---|---|---|
| 1,673,211 | 6/1928 | Staude ...................................... 188/77 |
| 1,703,313 | 2/1929 | Loughead ........................... 188/361 X |
| 1,812,036 | 6/1931 | Christensen ......................... 188/77 X |
| 1,875,436 | 9/1932 | Frese .................................... 188/77 X |
| 2,526,935 | 10/1950 | Coker ................................ 188/77 UX |
| 3,033,320 | 5/1962 | Edwards ................................... 188/70 |
| 3,220,514 | 11/1965 | Erickson .................................. 188/77 |

*Primary Examiner*—Duane A. Reger
*Attorney*—Robert K. Youtie

[57] ABSTRACT

A peripherally grooved rotary disc, a pair of pivotally connected arcuate shoes relatively swingable into and out of braking engagement within the disc groove, interconnecting means for effecting relative swinging of the shoes, and reinforcing means for enhancing the braking action of the shoes.

16 Claims, 8 Drawing Figures

INVENTOR.
JOHN MALLINGER
BY
Robert K. Youtie
ATTORNEY.

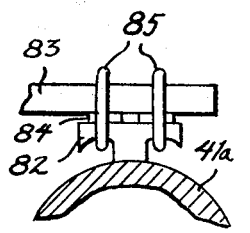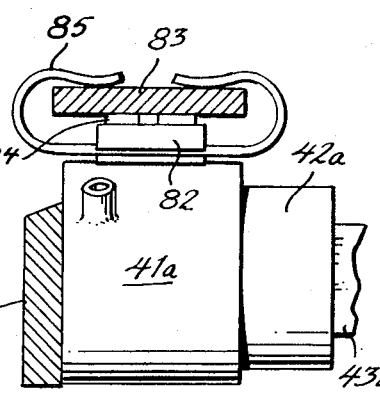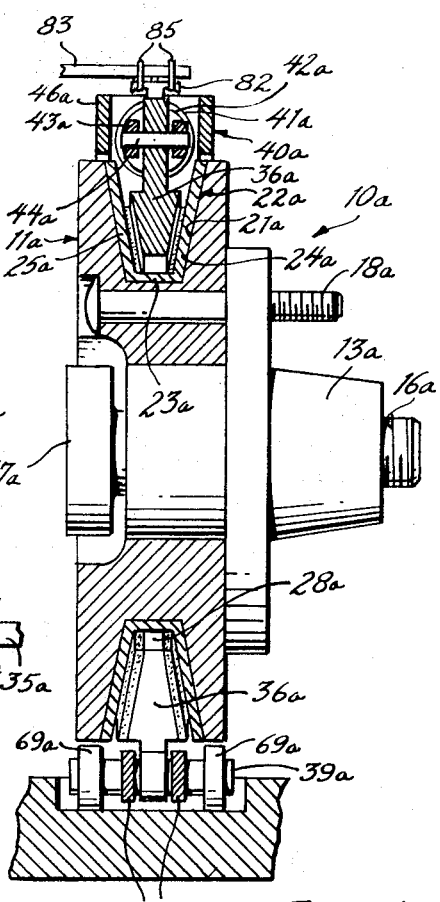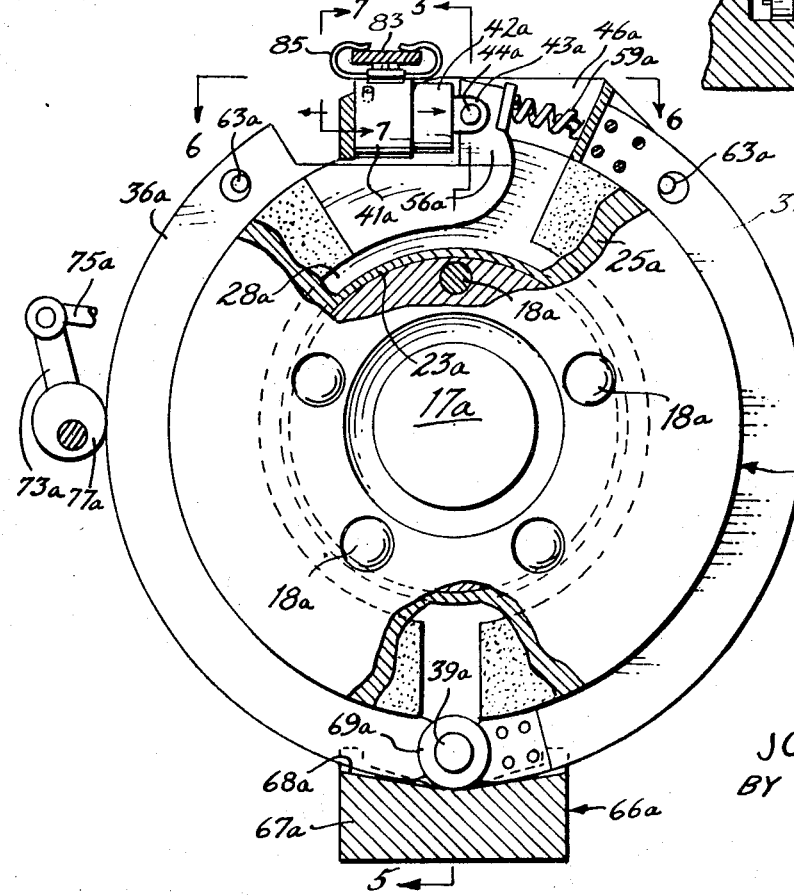

BRAKE DEVICE

BACKGROUND OF THE INVENTION

As is well known to those versed in the art, there have been experienced certain drawbacks in connection with disc brakes. For example, difficulty has been experienced in obtaining large surface area for frictional engagement without excessive wheel size, it being difficult to obtain self-energizing braking action in certain type disc brakes, and the requirement of a piston and cylinder assembly for each shoe being problematic in some designs.

SUMMARY OF THE INVENTION

Accordingly, it is an important object of the present invention to provide a unique disc type brake construction wherein a large surface area is available for frictional braking action to minimize wear and wheel size, the braking action being self-energizing if desired, and wherein relatively large or heavy duty brake devices as for large vehicles require only a single piston and cylinder assembly per brake.

It is a further object of the present invention to provide a brake device of the type described wherein braking action takes place substantially 360° about a disc, and wherein the piston and cylinder may be located sufficiently removed from the disc and shoes so as to be located in a cooling atmosphere.

It is still a further object of the present invention to provide a disc brake device having the advantageous characteristics mentioned in the preceding paragraphs, which is capable of utilizing a pair of arcuate shoes in a single peripheral disc groove, or selectively additional pairs of shoes in additional disc grooves, and which is extremely simple in construction for economy in manufacture, durability in use, and ease of maintenance and adjustment.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

BRIEF DESCRIPTION OF THE DRAWINGS

FIG. 4 is a side elevational view, partly broken away, similar to FIG. 1, but illustrating a slightly modified embodiment constructed in accordance with the teachings of the present invention.

FIG. 5 is a sectional elevational view taken generally along the line 5—5 of FIG. 4.

FIG. 6 is a partial sectional view taken generally along the line 6—6 of FIG. 4.

FIG. 7 is a fragmentary sectional view taken generally along the line 7—7 of FIG. 4.

FIG. 8 is a partial elevational view similar to FIG. 4, but enlarged for clarity.

DESCRIPTION OF THE PREFERRED EMBODIMENTS

Figures 1, 2, 3:
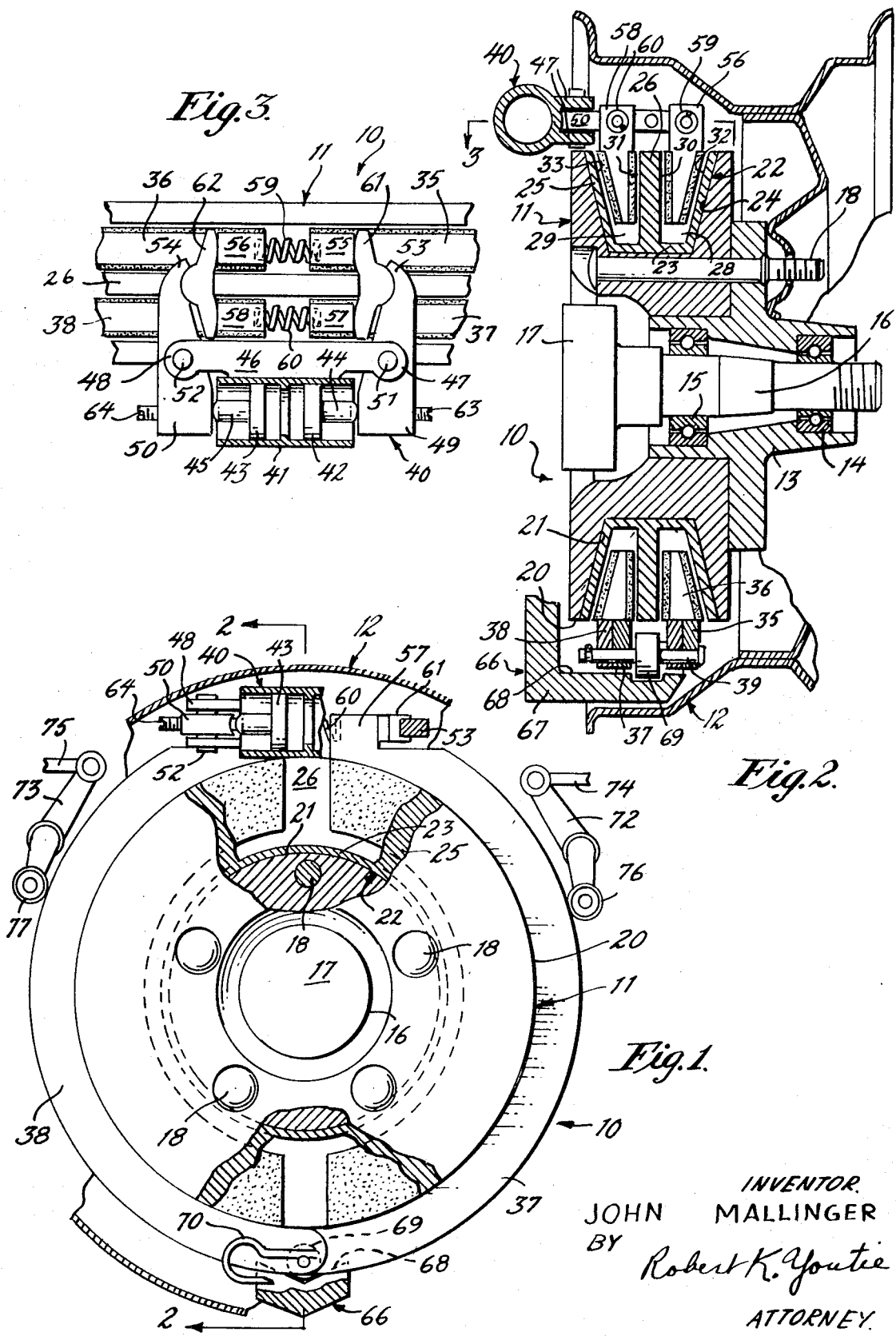
FIG. 1 is a side elevational view, partly in section and partly broken away, illustrating a brake device constructed in accordance with the teachings of the present invention.
FIG. 2 is a sectional elevational view taken generally along the line 2—2 of FIG. 1.
FIG. 3 is a partial sectional view taken generally along the line 3—3 of FIG. 2.

While the braking device of the present invention has been illustrated and described herein as applied to the wheel of a vehicle, it is appreciated that the instant braking device is capable of many varied applications, all of which are intended to be comprehended, the description and illustration being by way of example and without limiting intent.

Referring now more particularly to the drawings, and specifically to FIGS. 1–3 thereof, a braking device of the instant invention is there generally designated 10, and may include an axially rotatable disc 11 adapted to be carried by a vehicle wheel 12 for rotation therewith. That is, a wheel hub 13 is mounted, as by bearings 14 and 15 on an axle 16, the inner end of the axle, as at 17, being suitably connected to an appropriate support structure. The disc 11 is circumposed about the wheel hub 13 and suitably fixed thereto, as by bolts 18 or other fastening means. The wheel 11 is also suitably fixed to the hub 13, in any conventional manner.

The brake disc 11 may be of aluminum or other suitable material, aluminum being chosen for its light weight, strength and heat conductivity. The circumferential or peripheral surface 20 of the disc 11 is formed with an annular, circumferential, radially outwardly opening or facing groove 21. Fixed in the peripheral groove 21, by any suitable means (not shown), there is provided an insert 22 extending entirely about the groove, having a constant cross-sectional configuration and conformably engaged within the groove. In practice, the annular insert 22 is preferably of sectional construction permitting of assembly with the disc 11 in the groove 21.

As best seen in FIG. 2, the insert or disc liner 22 includes a bottom wall 23 extending about the bottom wall of the groove 21, and a pair of outer side walls extending circumferentially about opposite side edges of the bottom wall 23 an projecting radially outwardly therefrom, as at 24 and 25. It will be seen that the outer side walls 24 and 25 extend in a divergent or radially outwardly flaring relation with respect to each other, terminating at the peripheral disc surface 20. In addition, the disc groove liner 22 includes an annular intermediate wall 26 extending circumferentially about the annular bottom wall 23, laterally medially thereof, and projecting radially outwardly spaced intermediate the side walls 24 and 25, being radially coterminus with the side walls 24 and 25, and disc periphery 20. In practice, the sectional liner 22 may be fabricated of cast iron, or other suitable frictional wear-resistant material.

It will now be appreciated that the disc liner 22 serves to define within the peripheral region of the disc 11 a pair of spaced, side-by-side annular grooves 28 and 29, opening radially outwardly from the disc throughout their circumferential extent. Further, in the preferred embodiment, the intermediate wall 26 is generally flat, having parallel, oppositely facing surfaces 30 and 31 disposed generally normal to the axis of the disc, as defined by the axle 16. The outer side walls 24 and 25 have their respective surfaces 32 and 33 facing toward the intermediate wall surfaces 30 and 31, and being convergent toward the respective facing surface in the radially inward direction. Thus, the surfaces 32 and 33 are disposed in radially inwardly convergent relation with respective surfaces 30 and 31, and in angular relation with respect to the rotary axis or the axis of axle 16.

In each groove 28 and 29 are disposed a pair of elongate, arcuate brake shoes, each pair of shoes being connected together for relative swinging movement toward each other into braking engagement within the respective groove and away from each other out of said braking engagement. More particularly, a pair of arcuate, generally semicircular brake shoes 35 and 36 are disposed in end-to-end relation extending substantially completely about and within groove 28, while a substantially identical pair of arcuate, semicircular shoes are arranged in generally circular relation and disposed conformably within groove 29, as at 37 and 38. Each pair of end-to-end arranged brake shoes is pivotally connected together at one adjacent pair of ends, the lower ends as seen in FIGS. 1 and 2, as by suitable pivot means 39. The pivot means or pin 39 may extend through and connect both pairs of shoes 35 and 36, and 37 and 38. Thus, the end-to-end generally semicircular shoes 35 and 36 have their lower adjacent pair of ends pivotally connected together, as do the end-to-end generally semicircular pair of shoes 37 and 38. The generally arcuate shoes 35, 36, 37 and 38 each has its radially inner region of a substantially constant, generally wedge-shaped cross-section, best seen in FIG. 2, and provided with suitable lining material on its opposite sides, say of asbestos composition or other suitable material. The wedge-shaped cross-sectional configuration of each shoe 35–38, and its surfacing material or lining, is conformably received in a respective disc groove 28 and 29 and frictionally engageable therein upon relative swinging movement of the pivotally connected shoes toward each other.

A brake shoe operating mechanism is generally designated 40, and interconnected between the upper, nonpivoted ends of the brake shoes 35–38. The operating means may include a single cylinder 41 having its opposite ends open and provided with a pair of pistons 42 and 43 having piston rods 44 and 45 projecting oppositely outwardly through respective open cylinder ends. The cylinder 41 may be mounted by any suitable means (not shown) to a fixed structure of the vehicle, and is provided with a mounting member 46 extending oppositely beyond the cylinder ends and there provided with bearing members or ears 47 and 48. A pair of levers 49 and 50 are, respectively, pivotally connected by pins 51 and 52, to ears 47 and 48. More particularly, the lever 49 is pivotally mounted intermediate its ends to the ears 47, while the lever 50 is pivotally mounted intermediate its ends to the ears 48, and the levers 49 and 50 each have one end located for bearing engagement with a respective piston rod 44 and 45. The cylinder 41 is located radially outwardly beyond and offset from the plane of the disc 11, as best seen in FIG. 2; and, the levers 49 and 50 extend at their inner ends 53 and 54 into position directly radially outwardly of the disc 11 adjacent to the upper ends of shoes 35–38. The shoes 35–38 are each provided at its upper end with an upstanding lug, as at 55–58, respectively. Resilient means, such as coil compression springs 59 and 60 may be interposed between the upper adjacent pairs of brake shoe ends, to urge the relatively swingable shoes apart. For example the coil compression spring 59 may be interposed between the upper end lugs 55 and 56 of pivotally connected shoes 35 and 36, while the coil compression spring 60 may be interposed between the upper end lugs 57 and 58 of the pivotally connected shoes 37 and 38. A force equalizing engaging member 61 is interposed between the inner end 53 of lever 49 and both of the upper shoe and lugs 55 and 57, while a similar force equalizing engaging member 62 is interposed between the inner end 54 of lever 50 and both of the upper end shoe lugs 56 and 58. It will thus be appreciated that the application of fluid pressure to the interior of cylinder 41, between pistons 42 and 43, causes the pistons to separate, thereby swinging the levers 49 and 50 to cause their inner ends 53 and 54 to swing toward each other against the resilient forces of springs 59 and 60. The pivotally connected pairs of shoes 35 and 36, and 37 and 38 are thus swung toward each other and into frictional braking engagement within their respective grooves 28 and 29. Of course, release of fluid pressure in cylinder 41 releases the braking action by the resilient forces of springs 59 and 60. An adjustment of the braking action may be conveniently provided at the engagement of levers 49 and 50 with their respective piston rods 44 and 45, as by adjustment members or screws 63 and 64.

In addition to the above-described braking action, there is provided a self-energizing mechanism or structure, generally designated 66, for enhancing or reinforcing the braking action. Such reinforcing means may include a cam 67 suitably fixed to adjacent support means and having a cam surface 68, which may be generally V-shaped as seen in FIG. 1, located adjacent to the lower end pivotal connection means 39 of the brake shoes 35–38. Further, a cam follower 69, such as a roller, may be mounted on the pivot pin 39 for rolling engagement of the engagement of the cam surface 68. The cam surface is suitably configured such that upon angular displacement of brake shoes 35–38 about the axis of axle 16, the cam follower 69, and therefore the brake shoes 35–38, are caused to be displaced radially inwardly for enhanced or reinforced braking action in the grooves 28 and 29. This reinforcing or self-energizing braking action is effective upon angular displacement of the shoes 35–38 in either direction about the axis of axle 16, so that self-energizing is achieved upon braking both in forward and reverse movement of a vehicle, or the like.

Upon release of the fluid pressure to operating cylinder 41, the pivotally connected lower ends of shoes 35–38 are resiliently urged radially outwardly to automatically release the above-described reinforcing or self-energizing action. Suitable resilient means, such as a spring wire 70 may be employed to release the self-energizing action. For example, the spring wire 70 may have one end anchored in the fixed cam 67, and have its other end in resilient radially outwardly bearing engagement with the pivot pin 39.

The above-described brake device is admirably well suited to mechanical operation, in addition to the above-described fluid pressure operation. Thus, as a safety feature, say in the form of a hand brake, there may be provided a pair of levers 72 and 73, respectively pivoted intermediate its ends, and each having one end connected to an operating member or pull rod, as at 74 and 75. The other end of each lever 72 and 73 may be provided with a roller, as at 76 and 77 for bearing engagement with the radially outer sides of a pair of pivotally connected brake shoes 35–38. Thus, upon movement of the pull rod 74 and 75 away from each other, the rollers 76 and 77 serve to displace the shoes 37 and 38 toward each other for mechanically operating the braking device 10.

It will now be appreciated that the braking device of FIGS. 1–3 achieves a braking action at the surfaces 30 and 31 similar to that of a conventional disc brake, but of much greater area, extending substantially 360° about the wall 26. In addition, there is the enhanced braking effect of the wedge action upon movement of the shoes 35–38 into the grooves 28 and 29, which wedge action also is achieved throughout substantially 360°. This wedge action also compounds the braking action at the surfaces 30 and 31. Further, there is the above-described self-energizing or reinforcement of the braking action by the mechanism 66, including cam 67 and follower 69.

Considering now the additional embodiment of FIGS. 4–8, the braking device there illustrated is generally designated 10a, and includes a disc 11a fixed to a wheel hub 13a, as by suitable fastener means 18a, the hub being journaled on an axle 16a having its inner end 17a adapted for affixation to a suitable frame structure, or the like.

The disc 11a is similar to the disc 11, but may be of less thickness, different over the first-described disc in having its peripheral surface 20a formed with only a single circumferential groove 21a having a substantially constant cross-sectional configuration of radially inwardly converging sides terminating in a generally cylindrical bottom.

The single peripheral groove 21a of disc 11a is provided with a liner 11a conformably covering the sides and bottom of the groove 21a and fabricated of suitable wear-resistant material, such as iron, or the like. The liner 22a may be of sectional construction and fixed in the groove 21a by any suitable fastening means.

In particular, the liner 22a may include a pair of side walls 24a and 25a of generally frusto-conical configuration, similar to the first-described liner side walls 24 and 25, and a generally cylindrical liner bottom wall 23a similar to the first described liner bottom wall 23. The liner side walls 24a and 25a converge radially inwardly of the disc 11a terminating at their inner edges at opposite sides or ends of the liner bottom wall 23a. The radially outer edges of the liner side walls 24a and 25a may be substantially flush with the disc periphery or circumferential surface 20a.

It will thus be appreciated that there is defined within the liner 22a an annular, peripherally extending groove 28a of a constant cross-sectional configuration tapering in the radially inwardly direction and being open in the radially outward direction.

A pair of arcuate, generally semicircular brake shoes 35a and 36a are arranged in generally end-to-end relation to extend substantially completely about and being located within the groove 28a. The shoes 35a and 36a may have their lower ends pivotally connected together by suitable pivot means 39a, such as a pivot pin extending through overlapping portions of the lower shoe ends generally parallel to the axle 16a. As best seen in FIG. 5, the lower end of shoe 35a may be bifurcated to define spaced ears receiving the lower end of shoe 36a in overlapping relation therewith, the pivot or pin 39a extending through the overlapping lower end portions of the shoes.

The shoes 35a and 36a are each of substantially constant cross-section throughout its length, being disposed spacedly and conformably within the groove 28a. That is, the shoes 35a and 36a are generally wedge-shaped in cross-section, for conforming reception in the V-shaped groove 28a within the disc 11a. There may advantageously be provided on the sides of the wedge-shaped shoes 35a and 36a a covering of frictional material, such as asbestos composition or other suitable braking material for engagement with the groove liner 22a.

As noted above, the brake shoes 35a and 36a are each generally semicircular, having their upper ends proximate to each other in an upper region of the disc 11a. Interconnecting the upper ends of the arcuate brake shoes 35a and 36a is an operating mechanism, generally designated 40a, which is effective to move the brake shoes toward and away from each other, as will appear more fully hereinafter.

The operating means 40a may include an open, generally rectangular frame or yoke 46a having one end fixedly secured to the upper end of the shoe 35a. As best seen in FIGS. 4 and 6, the right-hand end of open frame or yoke 46a is fixedly secured to the upper end of shoe 35a. Mounted interiorly of the yoke or frame 46a, at the left-hand end thereof, is a cylinder 41a having one end open toward the right-hand end of the yoke. A piston 42a is slidable in the cylinder telescopically in opposite directions with respect to the cylinder, and is provided on its rightward end with a pair of spaced ears 43a projecting toward the right-hand end of the yoke.

The upper end of arcuate brake shoe 36a may be provided with an upstanding lug 56a projecting upwardly into the opening within the yoke 46a between the piston 42a and right-hand end of the yoke. More specifically, the end lug 56a of shoe 36a is interposed between the piston carried ears 43a and pivotally connected thereto, as by a pin 44a. The upstanding lug 56a may be provided with an enlargement 80 facing toward the rightward end of the open frame or yoke 46a, and a coil compression spring 59a may be interposed between the rightward end of the yoke and the lug enlargement 80 to resiliently urge the latter, and consequently the piston 42a leftward away from the rightward end of the yoke. As the upper ends of shoes 35a and 36a are respectively connected to the rightward end of the yoke 46a and the piston 42a, the resilient means 59a serves to urge the shoes away from each other about their pivoted lower end connection or pin 39a.

It will now be apparent that the application of fluid pressure interiorly of the cylinder 41a will effect movement of the piston 42a against the force of spring 59a to swing the shoes 35a and 36a toward each other into braking engagement within the groove 28a.

As in the first described embodiment, a self-energizing or reinforcing means 66a may include a cam 67a suitably fixed in position and having a generally V-shaped cam surface 68a facing radially inwardly of the disc 11a toward the pivot means or pin 39a. The pivot pin 39a may carry one or more rotatable cam followers or rollers 69a in rolling engagement with the cam surface 68a. The cam surface is configured so that upon angular displacement of the shoes 35a and 36a, and consequently of the pin 39a about the axis of disc 11a, the pin is caused to move radially inwardly of the disc to reinforce or enhance the braking action of the shoes in the disc groove 28a. This reinforcement or enhancement is a self-energized braking action.

While any suitable mounting means may be employed to mount the shoes 35a and 36a relative to the vehicle frame, one such mounting means is illustrated as including a generally T-shaped formation 82 on the upper side of cylinder 41a projecting upwardly toward and terminating short of a rigid support 83 suitably fixed to the frame. Bearing pads 84, such as teflon for freedom of movement, may be interposed between the formation 82 and support 83. Resilient, open looped members or springs, as at 85 may be engaged beneath the cross part of T-shaped formation 82 and about the support 83 to resiliently and yieldably retain the cylinder 41a in position. Of course, if desired, the self-energizing or reinforcing means 66a may be provided with resilient retraction means similar to the resilient member 70 of the first described embodiment, to insure release of braking action upon removal of pressure from the cylinder 41a, by return of the pivot member 39a radially outward, and return of the cylinder 41a to an intermediate position of its floating mount structure.

Suitable brake adjustment means may assume any desired structure, an eccentric type adjustment being shown at 63a.

Also, mechanical application of braking action may be achieved in the instant embodiment, as for an emergency brake, say by the provision of levers or arms 72a and 73a respectively swingably by pull rods 74a and 75a, and carrying eccentrics 76a and 77a for bearing engagement with respective shoes 35a and 36a to urge the latter toward each other into braking engagement within the groove 28a.

From the foregoing, it will now be understood that the present invention provides a braking device which affords improved braking action, simplicity in structure, reliability in use, economy in manufacture, installation, maintenance and repair, and which otherwise fully accomplishes its intended objects.

Although the present invention has been described in some detail by way of illustration and example for purposes of clarity of understanding, it is understood that certain changes and modifications may be made within the spirit of the invention.

What is claimed is:

1. A brake device comprising a rotary disc having a peripherally extending groove, said groove being configured to taper radially inwardly and opening radially outwardly, a pair of arcuate shoes arranged in end-to-end relation extending conformably along and spacedly within said groove, pivot means connecting together one pair of ends of said shoes for relative swinging movement of the shoes toward each other into braking engagement within the groove and away from each other out of said braking engagement, operating means interconnecting the other pair of shoe ends for moving the latter toward and away from each other, and reinforcing means comprising cam means operatively associated in camming engagement with said pivot means to move said shoes radially inwardly responsive to angular shoe displacement about the disc axis for enhancing the braking action of said shoes.

2. A brake device according to claim 1, said operating means comprising fluid actuable piston and cylinder means, and resilient means biasing said piston and cylinder means toward a position of shoe movement away from each other.

3. A brake device according to claim 2, said piston and cylinder means being offset from said groove and shoes, and comprising a yoke anchored to one of said shoes extending toward the other of said shoes, a cylinder carried by said yoke and having one end opening toward said one shoe, a piston slidable in said cylinder through said one cylinder end, and connection means connecting said piston to the other of said shoes, whereby reciprocatory sliding movement of said piston effects shoe movement toward and away from each other.

4. A brake device according to claim 2, said piston and cylinder means being offset from said groove and shoes for increased cooling remote from the heat of said shoes and disc.

5. A braking device according to claim 1, said shoes being substantially semicircular and combining for substantially circular braking engagement in said groove.

6. A brake device according to claim 5, said shoes being generally wedge-shaped in section for conforming braking engagement in said groove.

7. A brake device according to claim 1, in combination with resilient means urging said pivot means relative to said cam against the direction of angular shoe displacement for release of said braking action.

8. A brake device according to claim 7, said resilient means being operatively connected between said pivot means and cam.

9. A brake device comprising a rotary disc having a peripherally extending groove, said groove being configured to taper radially inwardly and opening radially outwardly, a pair of arcuate shoes arranged in end-to-end relation extending conformably along and spacedly within said groove, pivot means connecting together one pair of ends of said shoes for relative swinging movement of said shoes toward each other into braking engagement within said groove and away from each other out of said braking engagement, operating means interconnecting the other pair of shoe ends for moving the latter toward and away from each other, reinforcing means operatively associated with said shoes to move the latter radially inwardly responsive to angular shoe displacement about the disc axis for enhancing the braking action of said shoes, said disc being provided with a second peripherally extending groove alongside of said first-mentioned groove, said second groove tapering radially inwardly and opening radially outwardly, a second pair of arcuate shoes arranged in end-to-end relation conformably along and in spaced relation within said second groove, and second pivot means connecting together one pair of ends of said second shoes for relative swinging movement of said second shoes toward each other into braking engagement within said second groove and away from each other out of said braking engagement, said operating means interconnecting the other pair of ends of said second pair of shoes for moving the latter toward and away from each other, and said reinforcing means being operatively associated with said second pair of shoes to move the latter radially inwardly responsive to angular displacement of said second shoes about the disc axis for enhanced braking action of said second pair of shoes.

11. A brake device according to claim 9, said reinforcing means comprising a specifically configured cam engageable with said pivot means to effect said radial displacement.

12. A brake device according to claim 11, in combination with resilient means urging said pivot means relative to said cam against the direction of angular shoe displacement for release of said braking action.

13. A brake device according to claim 9, said operating means comprising fluid actuable piston and cylinder means, and resilient means biasing said piston and cylinder means toward a position of shoe movement away from each other.

14. A brake device according to claim 13, said piston and cylinder means being offset from said grooves and shoes for increased cooling remote from the heat of said shoes and disc.

15. A brake device according to claim 9, said shoes being substantially semicircular and combining for substantially circular braking engagement in said grooves.

16. A brake device according to claim 15, said shoes being generally wedge-shaped in section for conforming engagement in said grooves.

* * * * *